B. J. MUMM.
SAUSAGE CASING AND METHOD OF PRODUCING SAME.
APPLICATION FILED JULY 3, 1915.
1,204,812.
Patented Nov. 14, 1916.
2 SHEETS—SHEET 1.
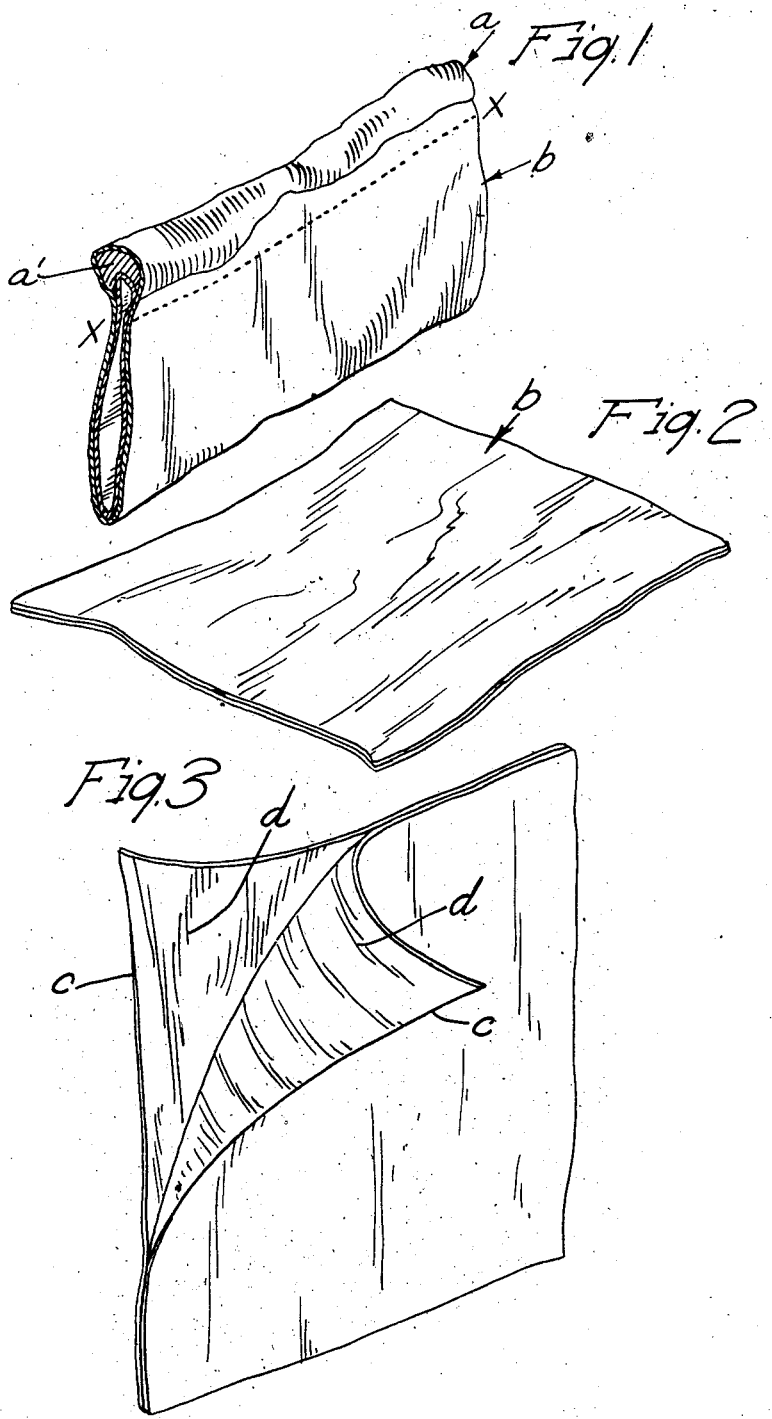
WITNESSES
E.C. Skinkle
H.D. Kilgore
INVENTOR
Bernard J. Mumm
BY HIS ATTORNEYS
Williamson & Merchant B. J. MUMM.
SAUSAGE CASING AND METHOD OF PRODUCING SAME.
APPLICATION FILED JULY 3, 1915.
1,204,812.
Patented Nov. 14, 1916.
2 SHEETS—SHEET 2.
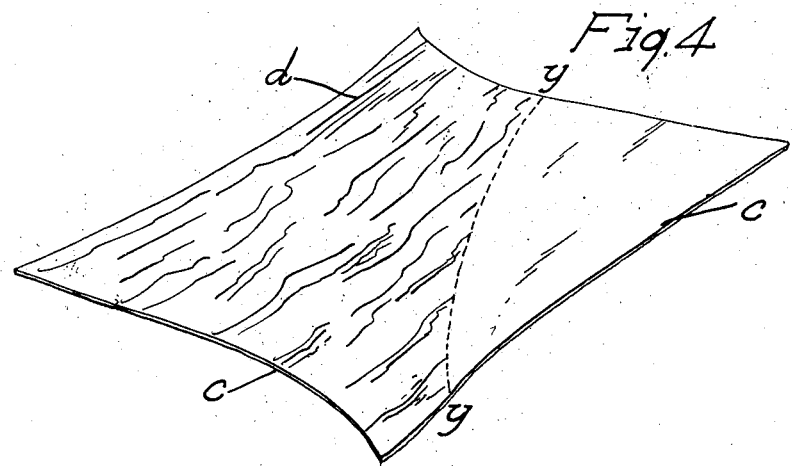
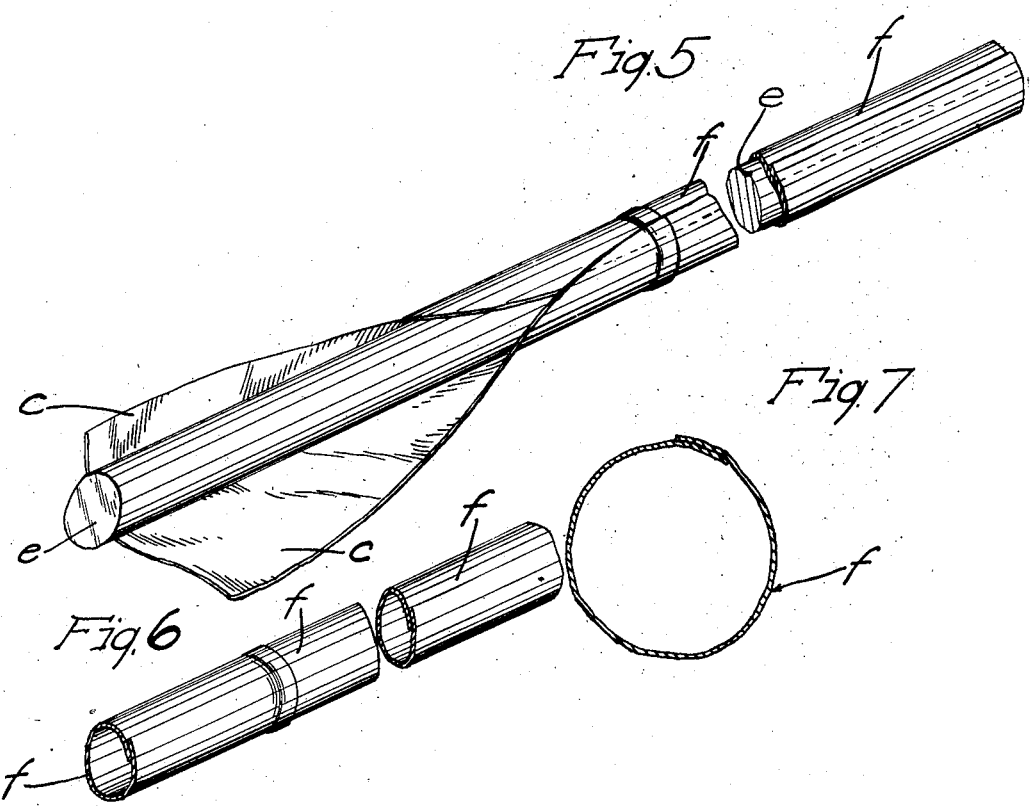
WITNESSES
E. C. Skinkle
H. D. Kilgore
INVENTOR
Bernard J. Mumm
BY HIS ATTORNEYS
Williamson & Merchant

UNITED STATES PATENT OFFICE.

BERNARD J. MUMM, OF ST. PAUL, MINNESOTA.

SAUSAGE-CASING AND METHOD OF PRODUCING SAME.

1,204,812.          Specification of Letters Patent.          Patented Nov. 14, 1916.

Application filed July 3, 1915. Serial No. 37,939.

*To all whom it may concern:*

Be it known that I, BERNARD J. MUMM, a citizen of the United States, residing at St. Paul, in the county of Ramsey and State of Minnesota, have invented certain new and useful Improvements in Sausage-Casings and Methods of Producing Same; and I do hereby declare the following to be a full, clear, and exact description of the invention, such as will enable others skilled in the art to which it appertains to make and use the same.

My invention has for its object to provide edible casings for sausage or other ground or subdivided meats, at greatly reduced cost.

To this end, my invention includes the novel product and the novel process or method of producing the same, hereinafter described and pointed out in the claims.

My invention was especially designed to reduce the cost of animal tissue casings of small diameter, suitable for breakfast and Wiener sausage, although, from the broad point of view, the invention has a more extended application.

Because it is especially intended for breakfast and Wiener sausage, I will first state the problem and the solution with reference to that usage. Everybody, of course, knows that animal intestines are usually employed as casings for sausage and similar ground or subdivided meats. This is done for several reasons, among which, the most controlling is that the animal tissue is edible and may be handled, cured, and cooked with the incased meat, without any injury to either. The fancy sausages, or so-called breakfast sausages, such as the Armour's Devonshire, the Jones, the "Brookfield" or the "Hormel's Dairy" sausage, are of small diameter; and, although such fancy sausages are usually made from young pork, the intestines from such young hogs are too large for that fancy type of sausage. Hence, it has long been the custom to employ sheep intestines for such breakfast sausages. Moreover, it is desirable that these casings be as strong as practicable to secure. It has been found that there is a great difference in this respect between the intestines of domestic or American sheep, and the intestines of sheep grown in some foreign localities, such as Great Britain and other parts of the continent of Europe. Because of this difference between the domestic and foreign sheep intestines, the highest grade sheep casings are imported and the price is considerably higher than the domestic. On the other hand, beef casings suitable for my purpose, are always relatively cheap, as compared to either the domestic or foreign sheep casings. For my purposes, hereinafter set forth, in detail, I would usually employ the "beef round casings," but could also use the "beef middles." Such beef intestines are, of course, larger than those of hogs and much larger in diameter than the intestines of sheep. I discovered that the walls of such beef intestines can be split into their constituent plies or membranes, and that, by the proper manipulation, this could be done, without injury to the splits or membranes, so separated. For example, I found that it was possible to split the original intestine into two tubular membranes of the same length as the original intestine. I, also, found that these splits or separated membranes were tough and strong enough for sausage casings. Hence, I at once, saw that here was a source of edible or natural animal tissue from which sausage casings, of any desired relatively small diameter, could readily be made, at small cost, compared with the price of sheep casings. Hence, I proceeded to make such novel casings by the novel process, hereinafter described.

The accompanying drawings illustrate the natural animal intestine or raw material and the finished product, and some of the different steps of the manipulation.

In said drawings, Figure 1 is a perspective view of a section of an animal's smaller intestine, such as comes from full grown cattle and are known in the trade as "beef round casings," some parts being exaggerated, or shown out of proportion, with a view of emphasizing features necessary to note; Fig. 2 is a perspective view of the main lateral section of the intestine, or casing shown in Fig. 1, laid out flatwise, before any split has been made in its wall; Fig. 3 is a perspective view of the same, after the split has been started, at one corner of the wall, to separate the same into two or more of its constituent membranes or splits; Fig. 4 is a perspective view of one of the splits or separated membranes, laid out flatwise, one corner portion having been cleared of the fibrous tissue; Fig. 5 is a perspective view, showing one means by which the splits, or sections of the separated membranes may be formed into tubes or casings of a desired standard diameter; Fig. 6 is a perspective view of the finished product or casing ready for use; and Fig. 7 is a cross section of such a casing, on a magnified scale, the enlargement being several times the standard size salable for fancy breakfast sausage.

It is a well known fact that the small intestines of animals, such as are here under consideration, contain more or less fatty fibrous material, in addition to the membranes or plies which make up the wall of the intestine. It is also well known that the bulk of this fatty fibrous material is chiefly found in a longitudinal chord running the entire length of the intestine, on an approximately straight line lengthwise of the intestine; but that there is also more or less fatty fibrous material distributed between the said membranes or plies of said wall and serving to bind or hold said membranes together. So far, I have not found it practical to use that particular lateral section of a natural intestine, containing said fatty chord, for making sausage casings from the wall splits or constituent membranes, for the reason that the two membranes, or one or the other thereof, is apt to perforate or tear, when being separated, with said fatty chord present, because of the intergrowth of the fatty fibrous material; and, hence, I cut out the section of the intestine, containing said fatty chord, and use the same for making by-products, as will later be more particularly noted.

It is well known that before handling cleaned intestines or casings, it is desirable to soften up the tissues by soaking the same in water. Otherwise, tearing and breaking is likely to occur. I have also, discovered that by crushing the fibrous fatty tissue, between the membranes or plies of the wall of the intestine, the said membranes can be separated from each other, or, in other words, the wall be split into its constituent membranes, without tearing or producing holes in the said membranes.

With these preliminary statements, the steps of manipulation, preferably employed by me for securing the new product herein disclosed, can be readily understood, and be made more distinct by reference to the drawings.

Let it be assumed that in Fig. 1 of the drawings, there is represented a section of a beef intestine, which has been soaked in water long enough (15 or 20 minutes) to soften up the tissues and thus condition it for the further desired treatment; and that the reference letters "*a*" and "*b*" represent two lateral sections of that intestine, and that the section "*a*" is the one containing the longitudinal chord of fatty material "*a'*."

These two sections "*a*" and "*b*" can be separated from each other by cutting the intestine on the dotted line *x*—*x*, and thereby the chord of fatty material *a'* will be removed with the section "*a*", and the relatively large lateral section "*b*" can be laid out flatwise, as shown in Fig. 2. This section "*b*" is then passed between yielding pressure rollers, or otherwise subjected to a crushing or rubbing action, by any suitable means, for crushing the fibrous fatty material "*d*", best shown in Fig. 3, which binds together the membranes "*c*", making up the wall of the natural intestine. If the rolling or rubbing action be most advantageously applied, it will also, in a measure, loosen up the two membranes slightly, in respect to each other, so that they can be taken hold of at the corner of the wall "*b*", by the fingers of the hand, and pulled apart, as shown partly done in Fig. 3; thus getting the two splits or membranes "*c*" separated. The said splits or membranes "*c*" are then cleaned or cleared of the threads of fibrous fatty tissue "*d*", found adherent thereto, at the time the two membranes are separated from each other; and this can most readily be done by laying the said splits or membranes "*c*" on a flat surface, and then rubbing the same with a cloth, which has been soaked in acetic acid or common vinegar. It may, however, be done by rubbing with the hands alone, or with the use of a cloth without acid. In Fig. 4 of the drawing, the part of the membrane "*c*", shown to the right of the dotted line *y y*, is assumed to have been cleared of the said fibrous fatty tissue, whereas the part to the left of said dotted line *y y*, shows such fatty tissue "*d*" to be still present. The cleared membranes "*c*" are then next stretched, by any suitable means, to get them back to their original width, or a little more, and while so stretched, the said cleared membranes are air-dried. It is advantageous to force the air into contact with the membranes by fans or suitable means.

The steps, so far described, should promptly follow each other in succession; but after the last named stage has been reached, the dried splits or membranes will maintain their shape and size, and the further steps may be proceeded with at any later time; or, in other words, the splits themselves may be made a stock article. The next step is to trim the dry splits or membranes "*c*", if need be, to get the same of proper width for the finished product or casing desired, depending upon the diameter of this desired product, and the amount of lap desired at the longitudinal joint, uniting the opposite longitudinal edges of the splits. After a sufficient number of splits have been thus trimmed to the desired width, they are joined endwise by cementing or otherwise securing together their adjacent ends to produce a band or blank of sufficient length for the tube or casing desired. Then this band or blank has its opposite longitudinal edges cemented or otherwise united, to get the same into tubular form. It is preferable to employ a round former "*e*" of approximately the same diameter as the standard desired finished product or casing. It is also desirable to lap the edges of the blank or band of splits or membranes, and then cement or otherwise secure together the lapped portions to afford a secure longitudinal joint. After the tube has thus been completed, the former "*e*" is removed and the final product or casing "*f*" will be in tubular form, as shown in Figs. 6 and 7, and be ready for the use intended.

I prefer to lap all the edges or ends of the splits or membranes "*c*," which require to be joined and united, and then to unite the same by an edible cement. The composition of this Nichols invisible court plaster is 38% ether, 20% acetone and 12% alcohol. It will be understood, however, that I may unite the said splits "*c*" at their lateral and longitudinal joints by any other suitable means. For example, it is entirely practicable to sew them together, by use of edible threads, made, for example, from fine strands of these same splits. The trimmings could be used to make such threads.

From the foregoing, it must be obvious that when such a translucent and nearly transparent animal tissue casing "*f*" is stuffed with sausage or similar ground or sub-divided meats, the sausage or other meat will clearly show through the thin casing, just as it does through a sheep casing. It must also be obvious that the sausage can be salted and smoked, or otherwise cured, and be handled and cooked in exactly the same way as if the natural animal intestine of original size had been employed as the casing. The advantage, if any, is with the casing made from the splits or separated membranes, instead of the original wall, because more tender and less of it.

By comparing my novel product with the statements hitherto made, in the early part of this specification, in respect to animal casings of natural size and the commercial cost thereof, it will be seen that I not only get two casings to one, in respect to length, but because of the great difference in the cost of my available raw material, such as beef round casings or beef middles, as compared with sheep casings, suitable for fancy breakfast sausage, I save several hundred per cent., assuming the raw material to be the chief element of the cost, which is a fact. Moreover, I have left the lateral section "*a*" cut from the original intestine, in order to remove therewith the fatty chord "*a'*," and which I use for making a salable by-product, towit: gut strings, suitable for tennis rackets, snow shoes, belt lacing, etc.; and this by-product has a value more than sufficient to cover the labor and overhead expense involved in the manufacture of the split casings, in the manner above described.

For the sake of clearness and brevity, the word "sausage" will be used in the claims in a broad or generic sense, which must be understood to include any and all kinds of ground or cut-up meats, whether generally known on the market, under the name of "sausage," or other names, such as "meat pudding," "suet," etc. It should also be noted that the soaking of the intestine in water, to soften the tissue, the cutting away of the lateral section, which would remove the longitudinal fatty chord, and the crushing of the fatty fibrous tissue between the membranes of the other or remaining main lateral section of the intestine or wall, may collectively be regarded as the conditioning phase of the process, considered as a whole; and, in respect to the said steps of preliminary treatment, the order of succession in which they are done is not vital. For example, the crushing might be done before the chord is removed, but not so well.

What I claim is:

1. An edible sausage tubular casing of small diameter, composed of lateral sections of membrane, split from the wall of an animal intestine of larger diameter, substantially as described.

2. An edible sausage tubular casing of small diameter, composed of lateral and longitudinal sections of the splits or separated constituent membranes of a natural animal intestine of larger diameter.

3. An edible tubular sausage casing of small diameter, composed of lateral sections of membrane, split from the wall of a natural animal intestine, and having their opposite longitudinal edges joined together, substantially as described.

4. An edible tubular sausage casing of small diameter, composed of lateral sections of membrane, split from the wall of a natural animal intestine of larger diameter, and having their opposite longitudinal edges lapped and joined together, substantially as described.

5. An edible tubular sausage casing of small diameter, composed of lateral and longitudinal sections of membrane, split from the wall of a natural animal intestine of larger size, and having the adjacent ends of the longitudinal sections lapped and joined together, and the opposite longitudinal edges of the lateral sections joined together, substantially as described.

6. The method of making two or more sausage tubular casings out of a single animal intestine, or longitudinal section thereof, which consists of splitting the wall of the natural intestine, into two or more of its constituent membranes, substantially as described.

7. The method of making edible sausage tubular casings of small diameter, from animal intestines of larger diameter, which consists in splitting from the wall of the natural intestine lateral sections of membrane and joining together the opposite longitudinal edges of said splits or sections.

8. The method of making edible sausage casings of small diameter from animal intestines of larger diameter, which consists in splitting from the wall of the natural intestines, lateral and longitudinal sections of membrane, joining together adjacent ends of the longitudinal sections and the opposite longitudinal edges of the lateral sections, substantially as described.

9. The method of making edible sausage casings of small diameter from animal intestines of larger diameter, which consists in cutting from the intestine a lateral section, which will remove therewith the longitudinal fatty chord of the intestine, then in splitting the remaining lateral section of the intestine into two or more of its constituent membranes, and then joining together the opposite longitudinal edges of said splits or membranes, substantially as described.

10. The method of making edible sausage casings of small diameter from animal intestines of larger diameter, which consists in cutting from the intestine a section, which will remove therewith the longitudinal fatty chord then splitting the remaining lateral sections of the intestines into two or more of its constituent membranes, joining together adjacent ends of the longitudinal sections and then joining together the opposite longitudinal edges of the lateral sections, substantially as described.

11. The method of making edible sausage tubular casings, of small diameter, from animal intestines of larger diameter, which consists in splitting from the wall of the natural intestine lateral sections of membrane, stretching and drying the same, and then joining together the opposite longitudinal edges of said splits or membrane sections, substantially as described.

12. The method of producing splits or lateral membrane sections from animal intestines, which consists in soaking the intestines, in water, to soften the tissue, crushing the fatty fibrous tissue between the plies or membranes composing the wall of the intestine, and then separating said membranes, substantially as described.

13. The method of producing splits or lateral membrane sections from animal intestines, suitable for making sausage casings, which method consists in soaking the intestines, in water, to soften the tissue, crushing the fatty fibrous tissue between the plies or membranes composing the wall of the intestine, then separating said membranes, and, then stretching and drying said splits or membranes, substantially as described.

14. The method of producing splits or lateral membrane sections from animal intestines, suitable for making sausage casings, which method consists in cutting from the intestine a lateral section, which will remove the longitudinal chord of fatty material, then crushing the fatty fibrous tissue uniting constituent membranes of the other lateral section, then separating said membranes from each other, then clearing the said membranes of the fatty fibrous material, and then stretching and drying said splits or membranes, substantially as described.

In testimony whereof I affix my signature in presence of two witnesses.

BERNARD J. MUMM.

Witnesses:
JAS. F. WILLIAMSON,
HARRY D. KILGORE.